US012763975B2

(12) United States Patent
Ruane

(10) Patent No.: US 12,763,975 B2
(45) Date of Patent: Oct. 13, 2026

(54) ENDORSED DEVICE CERTIFICATE CHAIN AUTONOMOUS EXTENSION

(71) Applicant: Micron Technology, Inc., Boise, ID (US)

(72) Inventor: James Ruane, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 50 days.

(21) Appl. No.: 19/041,611

(22) Filed: Jan. 30, 2025

(65) Prior Publication Data

US 2025/0247253 A1 Jul. 31, 2025

Related U.S. Application Data

(60) Provisional application No. 63/627,510, filed on Jan. 31, 2024.

(51) Int. Cl.
*H04L 9/32* (2006.01)
*G06F 8/65* (2018.01)

(52) U.S. Cl.
CPC .............. *H04L 9/3265* (2013.01); *G06F 8/65* (2013.01)

(58) Field of Classification Search
CPC ... H04L 9/3265; H04L 9/0891; H04L 9/3247; H04L 9/3268; G06F 8/65
USPC .......................................................... 713/157
See application file for complete search history.

(56) References Cited

U.S. PATENT DOCUMENTS

2017/0201380 A1* 7/2017 Schaap ................. H04L 63/083
2020/0313909 A1* 10/2020 Mondello ............. H04L 9/0869
2020/0313911 A1* 10/2020 Mondello ............. H04L 9/3247
2021/0184867 A1 6/2021 Melo et al.
2022/0078035 A1* 3/2022 Mondello ............. H04L 9/0861
2022/0222348 A1* 7/2022 Vaswani ............... H04L 9/3073
2022/0224550 A1* 7/2022 Mondello ............. H04L 9/0869
2022/0292203 A1* 9/2022 Severns-Williams ........................ G06F 21/57

(Continued)

FOREIGN PATENT DOCUMENTS

KR 20220137124 10/2022

OTHER PUBLICATIONS

"International Application Serial No. PCT US2025 013809, International Search Report mailed May 22, 2025", 3 pgs.

(Continued)

*Primary Examiner* — Samson B Lemma
(74) *Attorney, Agent, or Firm* — Schwegman Lundberg & Woessner, P.A.

(57) ABSTRACT

A processing device receives a firmware update for a memory sub-system comprising a memory device. Based on the firmware update, the processing device stores a private key of a first device identity key pair in a non-volatile memory component of the memory sub-system such that the private key is persisted upon reset. The first device identity key pair is based on a first device identifier. Upon reset of the memory sub-system, the processing device generates a second device identifier based on the firmware update and generates a second device identity key pair based on the second device identifier. The processing device generates a new device identity certificate based on a public key of the second device identity key pair and signs the new certificate using the private key of the first device identity key pair. The processing device injects the new certificate into a certificate chain for the memory device.

16 Claims, 7 Drawing Sheets

(56) References Cited

U.S. PATENT DOCUMENTS

| | | | | | |
|---|---|---|---|---|---|
| 2023/0254162 | A1 | 8/2023 | Liu | | |
| 2023/0274002 | A1* | 8/2023 | Orlando | H04L 9/0891 | 713/189 |
| 2023/0367575 | A1* | 11/2023 | Izzo | H04L 9/088 | |
| 2023/0394160 | A1 | 12/2023 | Patel | | |
| 2023/0396449 | A1* | 12/2023 | Orlando | H04L 9/3265 | |
| 2024/0073033 | A1* | 2/2024 | Chu | H04L 63/126 | |
| 2024/0179014 | A1* | 5/2024 | Ruan | H04L 9/3265 | |
| 2024/0249002 | A1* | 7/2024 | Yoon | G06F 21/575 | |

OTHER PUBLICATIONS

"International Application Serial No. PCT US2025 013809, Written Opinion mailed May 22, 2025", 5 pgs.

* cited by examiner

ENDORSED DEVICE CERTIFICATE CHAIN AUTONOMOUS EXTENSION

PRIORITY APPLICATION

This application claims the benefit of priority to U.S. Provisional Application Ser. No. 63/627,510, filed Jan. 31, 2024, which is incorporated herein by reference in its entirety.

TECHNICAL FIELD

Embodiments of the disclosure relate generally to memory sub-systems and, more specifically, to autonomous extension of a memory device certificate chain.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
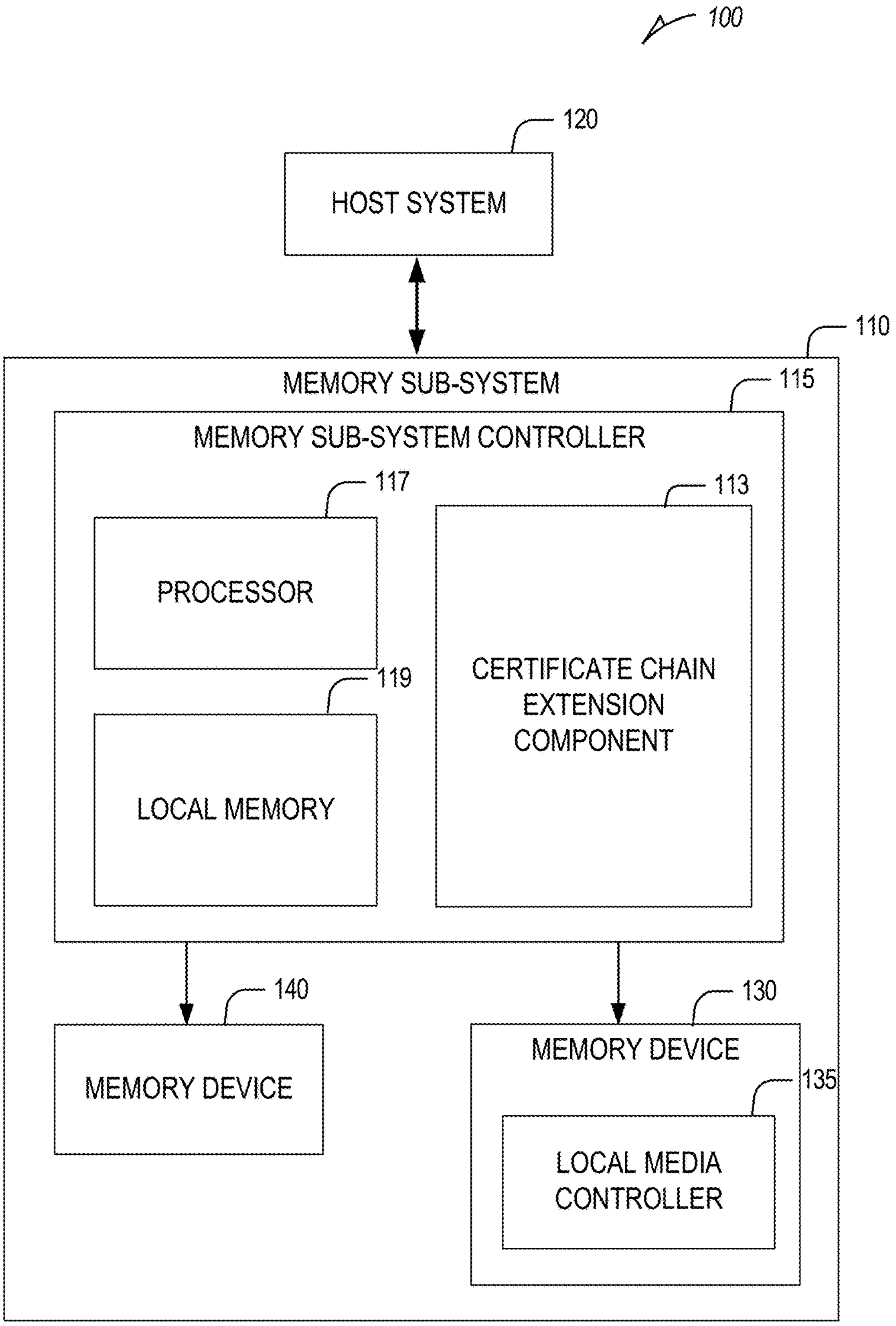
FIG. 1 illustrates an example computing environment that includes a memory sub-system, in accordance with some embodiments of the present disclosure.

Aspects of the present disclosure are directed to autonomous extension of a memory device certificate chain in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components (also hereinafter referred to as "memory devices"). The host system can provide data to be stored at the memory sub-system and can request data to be retrieved from the memory sub-system. A memory sub-system controller typically receives commands or operations from the host system and converts the commands or operations into instructions or appropriate commands to achieve the desired access to the memory components of the memory sub-system.

To protect sensitive information stored by memory sub-systems, Public Key Infrastructure (PKI) is often used to cryptographically sign and verify sensitive information. In this manner, trust of origin and the capability to detect unauthorized modification can be derived. Example uses of PKI include firmware signing and verification as well as authorization of commands that may compromise security of a memory sub-system.

In certain implementations, a public key of a public/private key pair (also referred to herein as "cryptographic keys") is provisioned to a memory sub-system by an original equipment manufacturer (OEM) prior to shipment to customers while the private key is secured by a hardware security module (HSM) of a secure system (e.g., operated the OEM) that is external to and independent of the memory sub-system. Rivest-Shamir-Adleman (RSA) PKI operations allow for encryption and decryption operations. Data encrypted by the public key can only be decrypted by the corresponding private key. Further, data may be digitally signed using a private key and the corresponding public key may be used to verify the digital signature. A public key used to verify digital signatures is also referred to herein as a verification key. A verification key may be provisioned to a memory sub-system by the OEM and hardcoded into firmware of the memory sub-system.

Device attestation is a process that allows a memory device to prove its identity via possession of a device generated private key along with a trusted certificate chain that allows identity keys to be trusted. An endorsed device identity certificate is typically injected into a memory device during manufacturing and an associated public key is cryptographically linked to first level mutable firmware (bootloader). The certificate chain is trusted by validating every certificate in the chain using the public key. Validating and trusting the memory device identity allows downstream features such as attesting a state of the memory device.

A memory device identity can change if the first level mutable firmware (bootloader) changes. When a memory device identity changes, a new identity certificate for the memory device needs to be generated and injected into the identity certificate chain of the memory device to restore trust in the device. Existing industry standard protocols and architectures (e.g., SPDM/CMA) allow for the identity certificate to be updated but require a trusted certificate authority to be available to generate the new identity certificate. However, certain environments do not allow for new certificates to be generated and installed when changes occur such as isolated environments with limited connectivity, environments that do not support a certificate authority, or environments that do not support certificate injection.

Aspects of the present disclosure address the above and other issues with conventional techniques for device attestation with a memory sub-system configured to autonomously extend a certificate chain of a memory device. In an example, a certificate chain of a memory device includes a first device identity certificate that is associated with a first device identity key pair comprising a public device identity key and a private device identity key. The first device identity certificate and the first device identity key pair are based on a first device identifier associated with memory device and generated based on initial first level mutable firmware (e.g., an initial bootloader). A firmware update comprising an update to the first level mutable firmware is received by the memory sub-system. The update to the first level mutable firmware requires the device identifier associated with the memory device to be updated, which in turns requires a new device identity certificate to be generated and injected into the certificate chain. To ensure that the new device identity certificate can be validly signed with a trusted identity key, prior to resetting and rebooting the memory sub-system to complete installation of the updated first level mutable firmware, a certificate chain extension component of the memory sub-system stores the first device identity key pair so that it is persisted upon reset and can be used to sign the new identity certificate. In some examples, the certificate chain extension component derives a wrapping key and uses the wrapping key to wrap the first device identity key pair to ensure that it is securely persisted upon system reset.

At boot time, the certificate chain extension component generates a second device identity key pair (the new device identity key pair) based on the updated firmware (the updated bootloader) and uses the second device identity key pair to generate a second device identity certificate (the new device identity certificate). The certificate chain extension component accesses the persisted first device identity key pair (the previous identity key pair) and uses the private key to sign the second device identity certificate thereby enabling the second device identity certificate to be trusted. Upon using the first identity key pair to sign the new device identity certificate, the certificate chain extension component destroys the first identity key pair. The certificate chain extension extends the certificate chain for the memory device by the new device identity certificate into the certificate chain.

Performing device attestation in the manner described herein allows the trusted certificate chain to be extended with a new device identity certificate and remain valid rather than replacing the device identity certificate in the chain.

FIG. 1 illustrates an example computing environment 100 that includes a memory sub-system 110, in accordance with some embodiments of the present disclosure.

The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a SSD, a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, and so forth.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a compute express link (CXL) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize a Non-Volatile Memory Express (NVMe) interface to access the memory devices 130 and 140 when the memory sub-system 110 is coupled with the host system 120 by the PCIe or CXL interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

An example of non-volatile memory devices (e.g., memory device 130) includes a NAND type flash memory. Each of the memory devices 130 can include one or more arrays of memory cells such as single level cells (SLCs), multi-level cells (MLCs) (e.g., triple level cells (TLCs), or quad-level cells (QLCs)). In some embodiments, a particular memory component can include an SLC portion, and an MLC portion, a TLC portion, or a QLC portion of memory cells. Each of the memory cells can store one or more bits of data used by the host system 120. Furthermore, the memory cells of the memory devices 130 can be grouped as memory pages or memory blocks that can refer to a unit of the memory component used to store data.

Although non-volatile memory components such as NAND type flash memory are described, the memory device 130 can be based on any other type of non-volatile memory, such as read-only memory (ROM), phase change memory (PCM), magneto random access memory (MRAM), NOR flash memory, electrically erasable programmable read-only memory (EEPROM), and a cross-point array of non-volatile memory cells. A cross-point array of non-volatile memory can perform bit storage based on a change of bulk resistance in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

The memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and the like. The local memory 119 can also include ROM for storing micro-code. While the example memory sub-system 110 in FIG. 1 has been illustrated as including the memory sub-system controller 115, in another embodiment of the present disclosure, a memory sub-system 110 may not include a memory sub-system controller 115, and may instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory devices 130. The memory sub-system controller 115 can further include host interface circuitry to communicate with the host system 120 via the physical host interface. The host interface circuitry can convert the commands received from the host system into command instructions to access the memory devices 130 and convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130.

The memory sub-system 110 also includes a certificate chain extension component 113 that is responsible for autonomously extending device identity certificate chains of memory device 130 and 140. For example, the certificate chain extension component 113 creates a new identity certificate for the memory device 130 based on a change to the device's identity (as reflected by an updated device identifier), ensures the new identity certificates is trusted (e.g., by ensuring it is signed with a trusted identity key), and injects the trusted new identity certificate into the identity certificate chain for the memory device 130 thereby extending the trusted identity certificate chain.

In some embodiments, the memory sub-system controller 115 includes at least a portion of the certificate chain extension component 113. For example, the memory sub-system controller 115 can include a processor 117 (processing device) configured to execute instructions stored in local memory 119 (e.g., firmware) for performing the operations described herein. In some embodiments, the certificate chain extension component 113 is part of the host system 120, an application, or an operating system. Further details regarding the certificate chain extension component 113 are discussed below.

Figure 2:
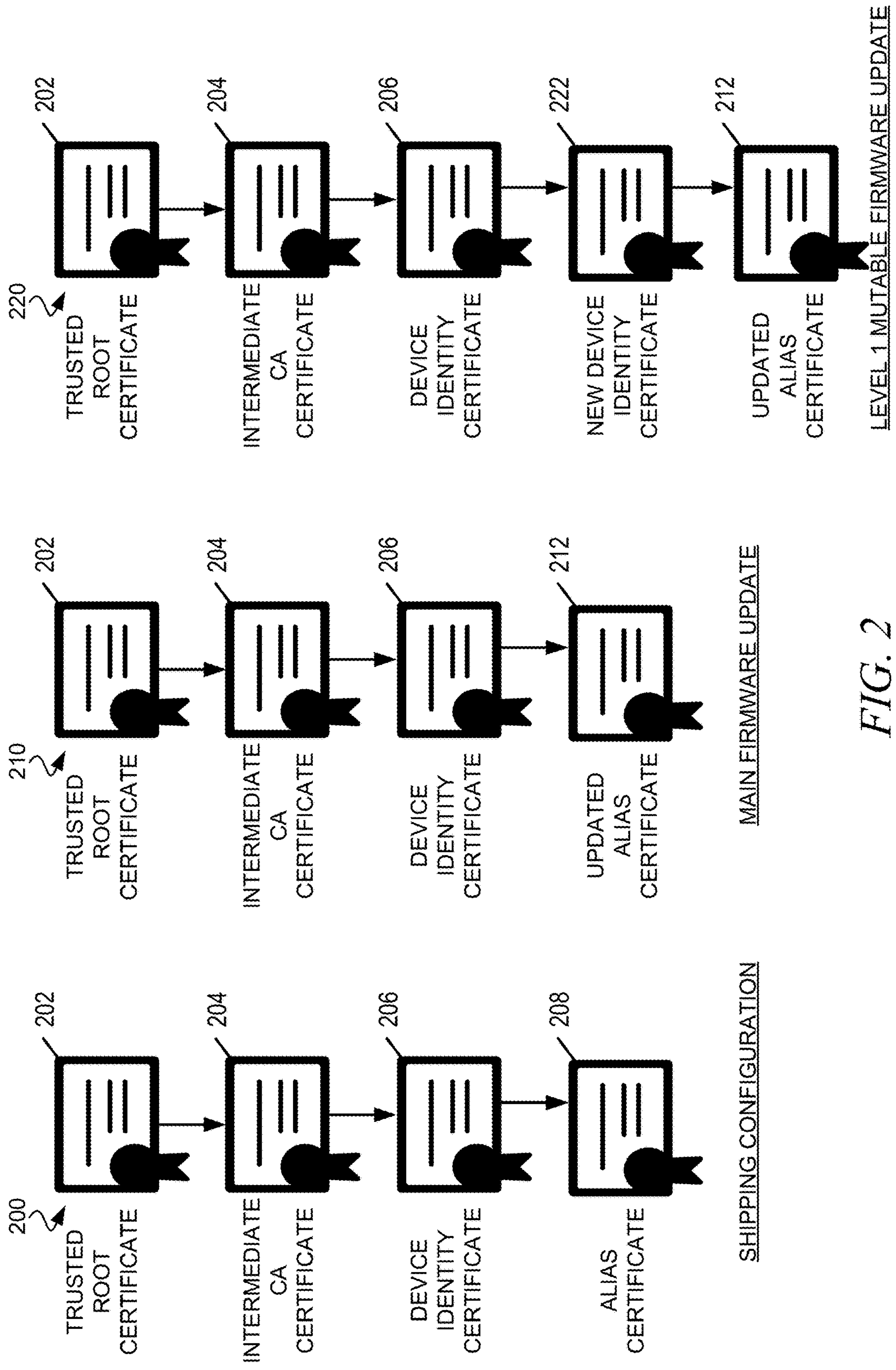
FIG. 2 is a conceptual diagram illustrating example extensions to a memory device certificate chain, in accordance with some embodiments of the present disclosure.

FIG. 2 is a conceptual diagram illustrating an example autonomous extension of a certificate chain of the memory device 130 in the memory sub-system 110, in accordance with some embodiments of the present disclosure. More specifically, FIG. 2 illustrates an initial certificate chain 200, an updated certificate chain 210 based on the initial certificate chain 200, and an extended certificate chain 220 based on the updated certificate chain 210.

Each of the certificate chains for the memory device 130 illustrated in FIG. 2 comprises a chain of device certificates. A device certificate comprises a public key along with device specific information. A device certificate is signed by a certificate authority (CA), which, if trusted, transfers trust to the signed certificate. This trust extends from the CA root certificate all the way to leaf certificates in the certificate chain. Certificates and certificate chains are used to validate trust in the use of a public key to verify information and also to validate possession of the associated private key, which can be used to attest to the identity of the device and associated firmware measurements. To support autonomous certificate chain extension, the certificate chain extension component 113 of the memory sub-system 110 includes an embedded certificate authority (ECA) that includes an asymmetric key (referred to as a device identity key) that the certificate chain extension component 113 uses to sign new device identity certificates. A key pair generated by the ECA is referred to herein as a "device identity key pair."

As shown, the initial certificate chain 200 comprises a root certificate 202, an intermediate CA certificate 204, a device identity certificate 206, and an alias certificate 208. In this example, the initial certificate chain 200 corresponds to a shipping configuration of the memory sub-system 110. The device identity certificate 206 comprises a public key of an initial device identity key pair and is signed using the corresponding private key of the initial device identity key pair.

The updated certificate chain 210 is a result of an update to main firmware for the memory sub-system 110. Accordingly, as shown, the alias certificate 208 is replaced with an updated alias certificate 212 in the updated certificate chain 210. The updated alias certificate 212 is generated in response to the update to main firmware.

The extended certificate chain 220 results from an update to first level mutable firmware (bootloader) of the memory sub-system 110. Upon loading the update to the first level mutable firmware, the memory sub-system 110 is reset and rebooted. Prior to reset, the certificate chain extension component 113 stores the initial device identity key pair in a persistent storage component such that the initial device identity key pair is not lost upon reset. At boot time, the certificate chain extension component 113 creates a new device identity (a new device identifier) along with a new device identity key pair for the memory sub-system 110. The certificate chain extension component 113 generates a new device identity certificate 222 comprising the public key from the new device identity key pair and the certificate chain extension component 113 uses the private key from the initial device identity key pair to sign the certificate. The certificate chain extension component 113 destroys the initial device identity key pair upon signing the new device identity certificate 222 and injects the signed device identity certificate 222 into the updated certificate chain 210 thereby resulting in the extended certificate chain 220. Further details regarding the operation of the certificate chain extension component 113 are discussed below.

Figure 3A:
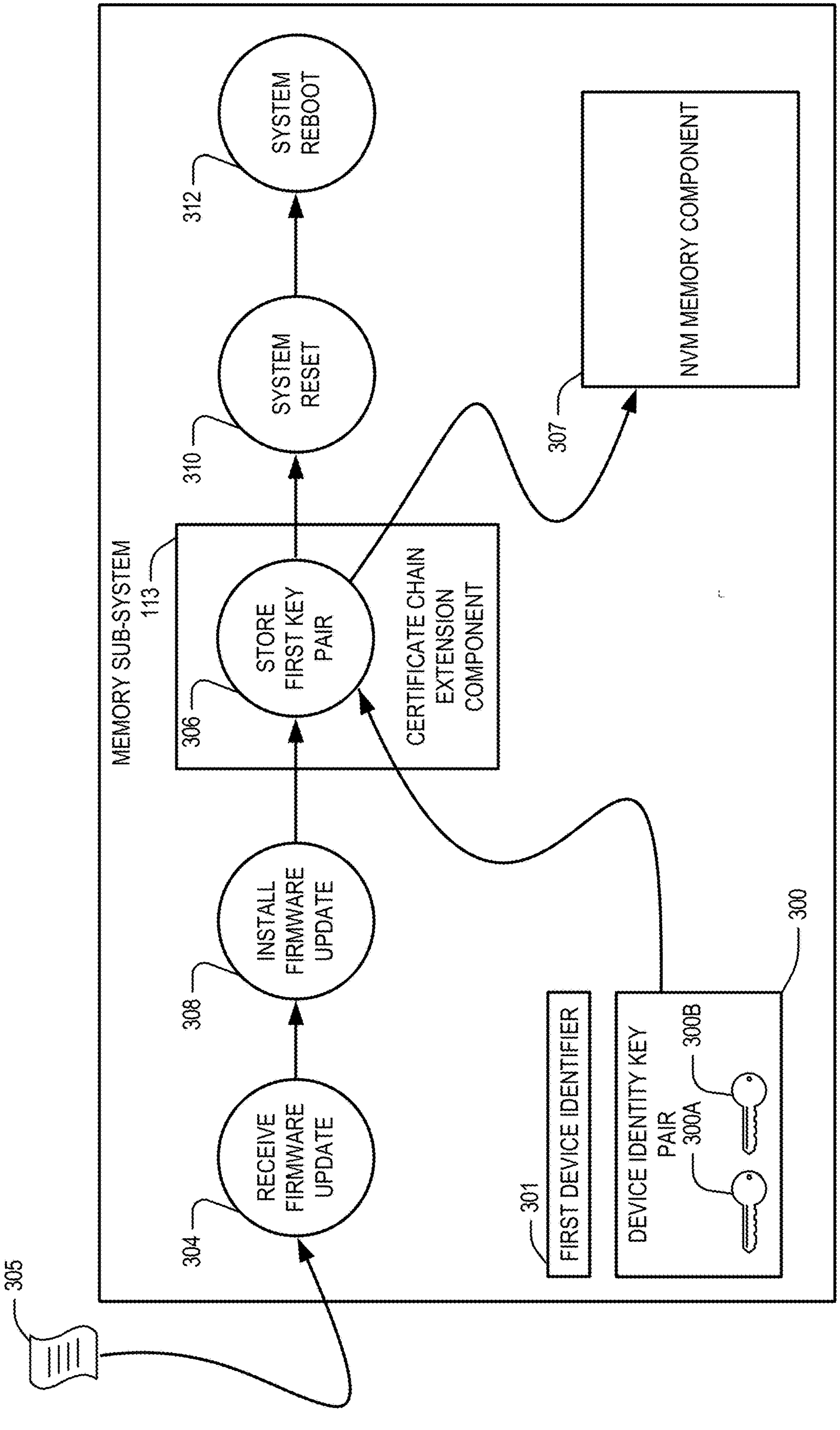
FIGS. 3A and 3B are data flow diagrams illustrating interactions between components in a secure communication environment in performing an example method for autonomous extension of a memory device certificate chain, in accordance with some embodiments of the present disclosure.
Figure 3B:
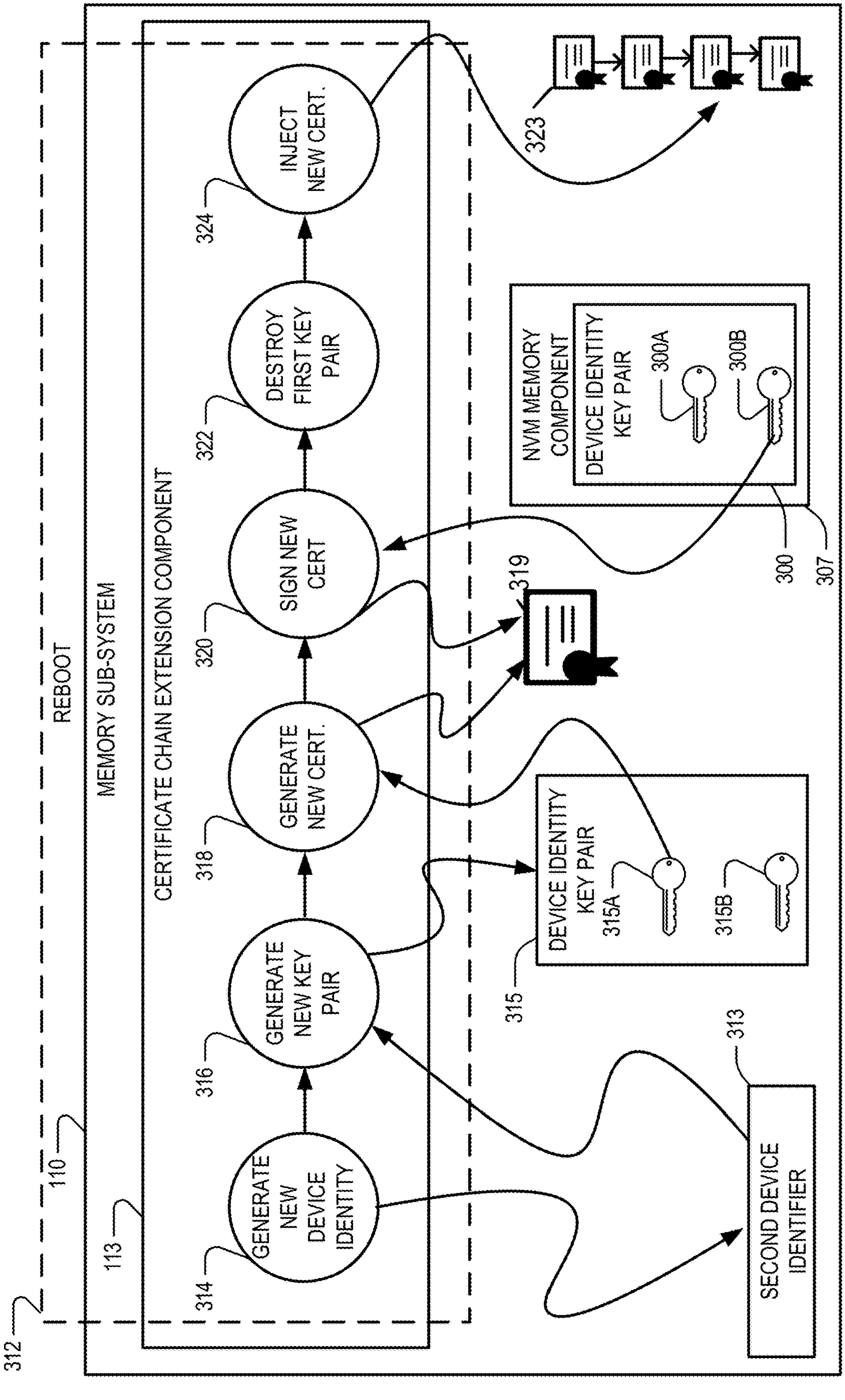

FIGS. 3A and 3B are data flow diagrams illustrating interactions between components in performing an example method for autonomous measurement attestation by the memory sub-system 110, in accordance with some embodiments of the present disclosure. With reference to FIG. 3A, the memory device 130 of the memory sub-system 110 initially has a first device identity corresponding to a first device identifier 301. In an example, the first device identifier 301 is generated by combining a first firmware measurement and a unique device secret using a one-way function. The first firmware measurement comprises a first secure hash generated based on initial first level mutable firmware (e.g., an initial bootloader). The unique device secret comprises a value generated within the memory device 130 that is not disclosed outside of the memory device 130. In an example, the unique device secret is a value generated by a random number generator and stored in an e-fuse.

A first device key pair 300 (e.g., a PKI-based key pair) is generated based on the first device identifier 301 associated with the memory device 130. The first device key pair 300 comprises a public key 300A and a private key 300B. The first device identity key pair 300 is generated using a key derivation function (KDF) based on the first device identifier 301 and the first firmware measurement (e.g., based on mechanisms described by the NIST SP-800-108 specification).

At operation 304, the memory sub-system 110 receives a firmware update 305 (e.g., from the host system 120). The firmware update 305 comprises an update to first level mutable firmware used to boot the memory sub-system 110 (e.g., an updated bootloader).

In response to receiving the update to the firmware, the certificate chain extension component 113, at operation 306, stores the first device identity key pair 300 in a NVM component 307 such that the first device identity key pair 300 is persisted upon a reset of the memory sub-system 110 so that it can be used to sign a new device identity certificate. In some examples, in storing the first device identity key pair 300, the certificate chain extension component 113 derives a wrapping key and uses the wrapping key to wrap the first device identity key pair 300.

The firmware update 305 is installed at operation 308 and the memory sub-system 110 is reset, at operation 310, upon installation of the update 305. A rebooting process 312 is initialized upon reset. Further details regarding the rebooting process 312 are illustrated by FIG. 3B and discussed below.

As shown in FIG. 3B, during the rebooting process 312, the certificate chain extension component 113 generates a new device identity of the memory device 130 based on the firmware update 305. More specifically, the chain extension component 113 generates a second device identifier 313 associated with the memory device 130 based on the firmware update 305 (operation 314) and generates a second device identity key pair 315 (e.g., a PKI-based key pair) based on the second device identifier 313 (operation 316).

In an example, the certificate chain extension component 113 generates the second device identifier 313 by combining a second firmware measurement and the unique device secret using the one-way function. The second firmware measurement comprises a second secure hash generated based on the updated first level mutable firmware. Consistent with this example, the certificate chain extension component 113 uses the KDF to generate the second device identity key pair 315 based on the second device identifier 313 and the second firmware measurement. The second device identity key pair 315 comprises a public key 315A and a private key 315B. In an example, the second device identity key pair 315 is stored in NAND memory of the memory device 130 in a dedicated file system for storing sensitive information.

At operation 318, the certificate chain extension component 113 generates a new device identity certificate 319 corresponding to the new device identity (as reflected by the second device identifier 313). The new device certificate 319 comprises the public key 315A of the second device identity key pair 315 along with additional information. As an example, the additional information can include any one or more of: a certificate identifier; a certificate lifetime (e.g., defining an expiration time for the certificate); a country code; a state or province name; a locality of the manufacturer of the device; an organization that manufactured the device; an organizational unit of the organization; an identifier of the device; enabled policy uses; and basic constraints.

The certificate chain extension component 113 accesses the first device identity key pair 300 and uses the private key 300B of the first device identity key pair 300 to sign the new device identity certificate 319, at operation 320. Upon signing the new device identity certificate 319 with the private key of the first device identity key pair 300, the certificate chain extension component 113 destroys the first device identity key pair 300, at operation 322.

The certificate chain extension component 113 injects the signed new device identity certificate 319 into a certificate chain 323 of the memory device 130 (e.g., certificate chain 210 of FIG. 2), at operation 324, thereby securely extending the certificate chain 323. In an example, the certificate chain 323 is stored in NAND memory of the memory device 130 on a dedicated file system area for storing certificates. To extend the certificate chain 323, the certificate chain extension component 113 stores the new device identity certificate 319 in an active memory slot (e.g., in local memory 119) designated for a current device identity certificate in the certificate chain 323.

Figure 4:
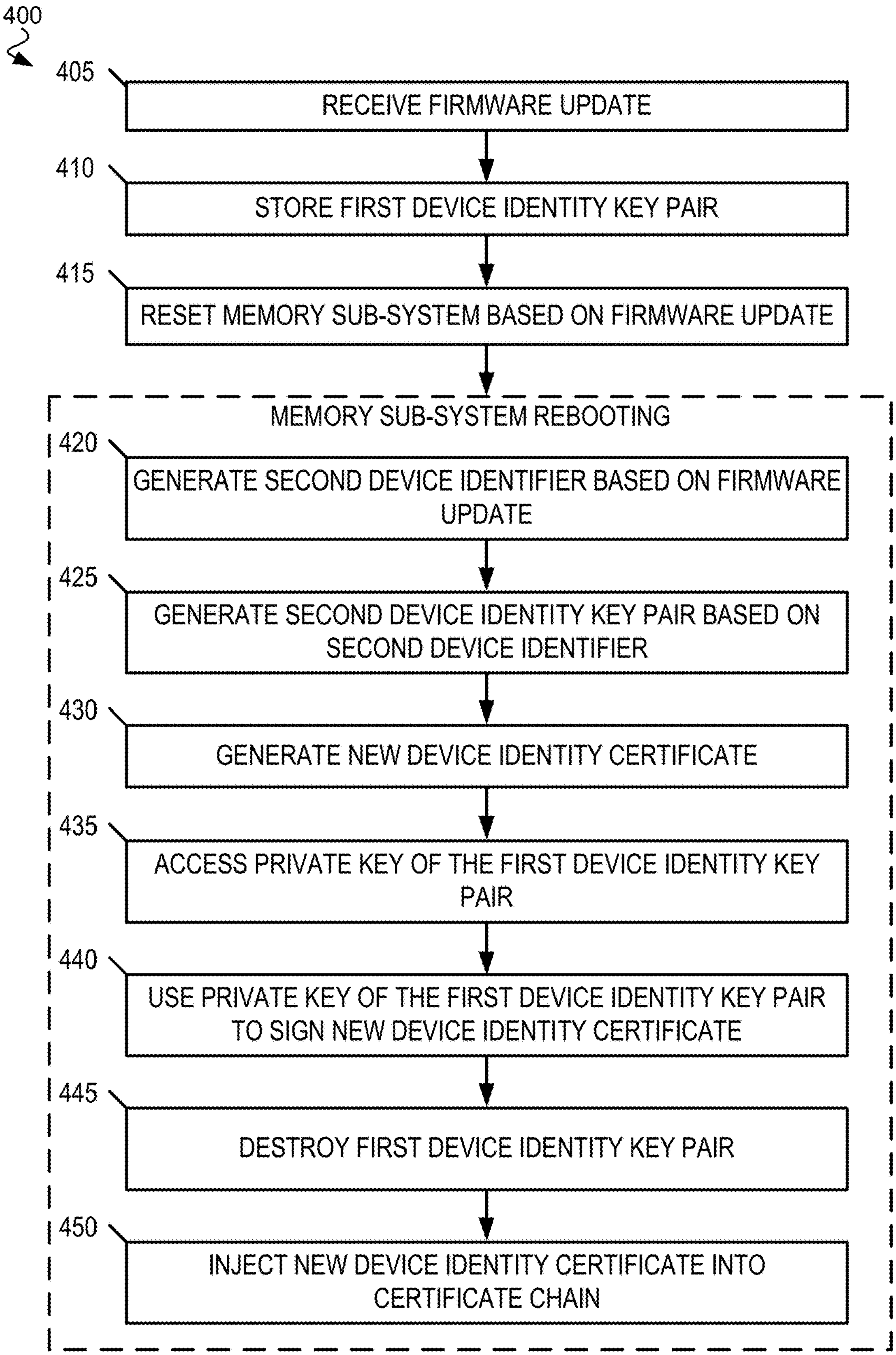
FIGS. 4 and 5 are flow diagrams illustrating an example method for autonomous extension of a memory device certificate chain, in accordance with some embodiments of the present disclosure.
Figure 5:
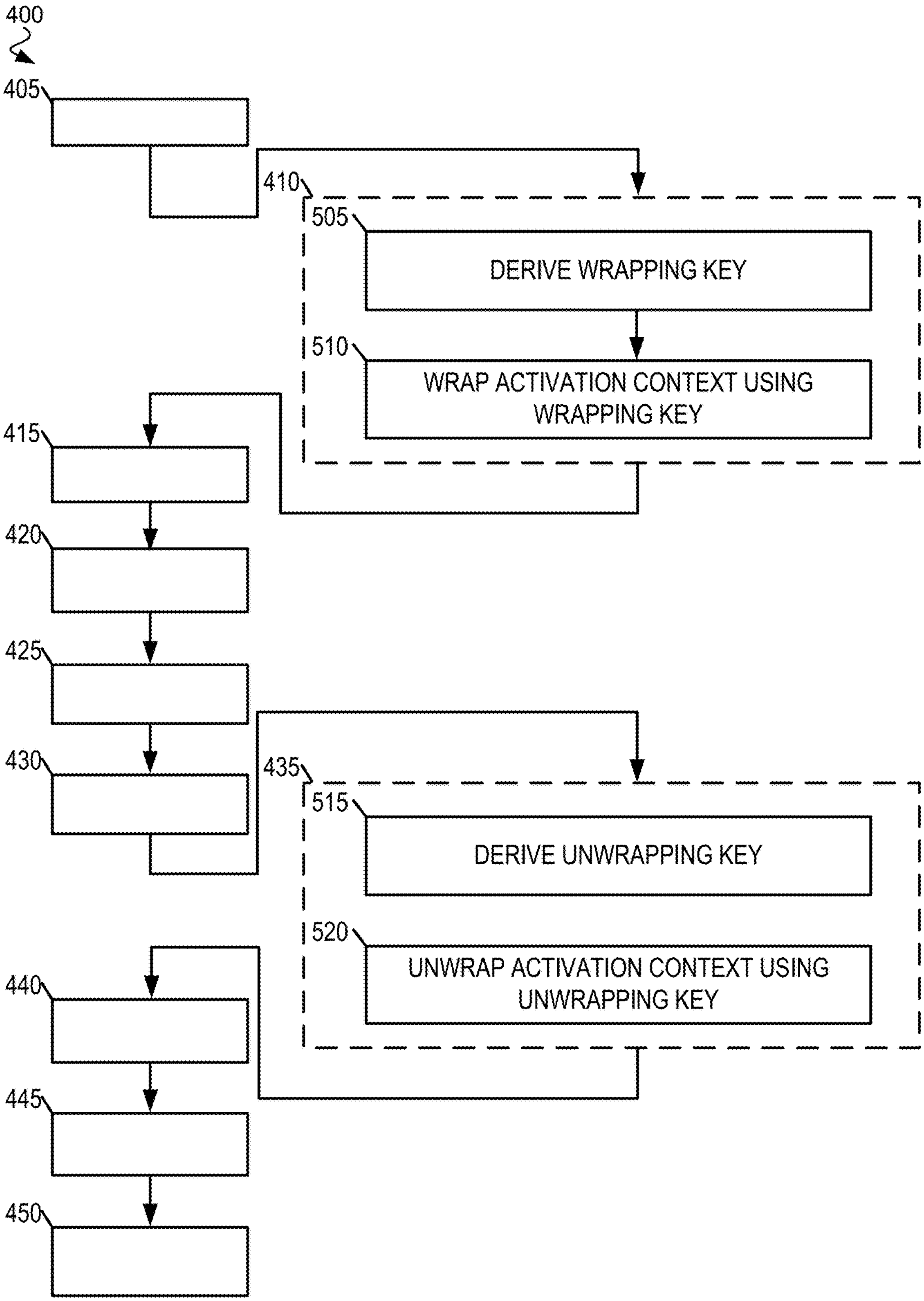

FIGS. 4 and 5 are flow diagrams illustrating an example method 400 for autonomous extension of a memory device certificate chain, in accordance with some embodiments of the present disclosure. The method 400 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 400 is performed by the certificate chain extension component 113 of FIG. 1. Although processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing device receives an update to firmware for a memory sub-system (e.g., memory sub-system 110) comprising a memory device (e.g., the memory device 130). In an example, the processing device receives the firmware update from a host system (e.g., host system 120) in communication with the memory sub-system 110. The update to firmware comprises an update to first level mutable firmware used to boot the memory sub-system (e.g., a bootloader).

In response to receiving the update to the firmware, the processing device, at operation 410, stores a first device identity key pair in a NVM component such that the first device identity key pair is persisted upon a system reset. The first device identity key pair is generated based on a first device identifier associated with the memory device that is based on a firmware image representative of a state of the firmware prior to the update. In an example, the processing device generates the first device identifier combining a first firmware measurement and a unique device secret using a one-way function. The first firmware measurement comprises a first secure hash generated based on initial first level mutable firmware (e.g., an initial bootloader). Consistent with this example, the processing device generates the first device identity key pair using a KDF and based on the first device identifier and the first firmware measurement.

The memory sub-system is reset, at operation 415, upon installation of the update to the firmware. A rebooting process is initialized upon reset. At boot time, the processing device generates a second device identifier associated with the memory device based on the update to the firmware (operation 420) and the processing device generates a second device identity key pair based on the second device identifier (operation 425). In an example, the processing device generates the second device identifier by combining a second firmware measurement and the unique device secret using the one-way function. The second firmware measurement comprises a second secure hash generated based on the updated first level mutable firmware. Consistent with this example, the processing device uses the KDF to generate the second device identity key pair based on the second device identifier and the second firmware measurement.

At operation 430, the processing device generates a new device identity certificate 319 corresponding to the second device identifier (the new device identity) associated with the memory device. The new device certificate comprises the public key of the second device identity key pair along with additional information such as any one or more of: a certificate identifier; a certificate lifetime (e.g., defining an expiration time for the certificate); a country code; a state or province name; a locality of the manufacturer of the device; an organization that manufactured the device; an organizational unit of the organization; an identifier of the device; enabled policy uses; and basic constraints.

The processing device, at operation 435, accesses the private key of the first device identity key pair associated with the first device identifier and uses the private key to sign the new device identity certificate, at operation 440. Upon signing the new device identity certificate with the first device identity key, the processing device destroys the first device identity key, at operation 445.

The processing device injects the signed new device identity certificate into a certificate chain of the memory device, at operation 450, thereby securely extending the certificate chain. In injecting the new device identity certificate, the processing device stores the new device identity certificate in an active memory slot in local memory designated for a current device identity certificate in the certificate chain of the memory device.

As shown in FIG. 5, the method 400 can, in some embodiments, include operations 505, 510, 515, and 520. Consistent with these embodiments, the operations 505 and 510 may be performed prior to or as part of the operation 410 where the processing device stores the first device identity key pair.

At operation 505, the processing device derives a wrapping key for wrapping an activation context based on a first set of firmware measurements. The activation context comprises the first identity device key and, in some examples, further comprises additional information. The processing device derives the wrapping key by providing the first set of firmware measurements as input to a KDF (e.g., a counter-based HMAC_SHA2-512/256). Each firmware measurement comprises a secure hash associated with a component of the memory sub-system 110 being measured. Each firmware measurement is calculated by generating the secure hash based on a portion of a firmware image corresponding to the component being measured. In an example, the set of firmware measurements are stored in platform configuration registers (PCRs), which may be implemented as consecutive locations in ROM. The PCRs are set to zero upon reset. A measurement component of the memory sub-system 110 extends the measurements from ROM. A given firmware measurement is extended using a measurement of a corresponding portion of the firmware image, which is a secure hash associated with the portion of the current firmware image. Consistent with this example, the function utilized by the measurement component in calculating a given system measurement as follows:

PCR_ID=SHA512(PCR_ID_Value||Extended Information)

where the extended information comprises a measurement of the firmware component, which is a secure hash associated with the component of the firmware image corresponding to the component of the memory sub-system 110 to which the measurement corresponds.

At operation 510, the processing device wraps the activation context using the wrapping key. The processing device may utilize one of many known wrapping techniques to wrap the activation context (e.g. based on the AES key wrap specification or American Standards Committee ANSX9.102 specification).

Consistent with these embodiments, the operation 515 can be performed as part of the operation 435 where the processing device accesses the private key of the first device identity key pair. At operation 515, the processing device derives an unwrapping key for unwrapping the activation context based on a second set of firmware measurements. The processing device derives the unwrapping key by providing the second set of firmware measurements as input to the KDF. Assuming that the first and second set of firmware measurements match, the unwrapping key is identical to the wrapping key. The processing device using the unwrapping key to unwrap the activation context (at operation 520) thereby enabling the processing device to access the first identity key.

Example 1. A memory sub-system comprising: a memory device; a non-volatile memory component storing a private key of a first device identity key pair generated based on a first device identifier; and a processing device, operatively coupled with the memory device and the non-volatile memory component, to perform operations comprising: generating a second device identifier based on an update to firmware of the memory sub-system; generating a second device identity key pair based on the second device identifier; generating a new device identity certificate for the memory sub-system based on a public key of the second device identity key pair; accessing the private key of the first device identity key pair; signing the new device identity certificate using the private key of the first device identity key pair; and injecting the new device identity certificate into a certificate chain for the memory device.

Example 2. The memory sub-system of Example 1, wherein the operations further comprise destroying the private key of the first device identity key pair upon signing the new device identity certificate.

Example 3. The memory sub-system of any one of Examples 1 or 2, wherein the operations further comprise: receiving the update to the firmware of the memory sub-system; and in response to receiving the update to the firmware, storing the private key of the first device identity key pair in the non-volatile memory component such that the private key is persisted upon reset.

Example 4. The memory sub-system of any one of Examples 1-3, wherein storing the private key of the first device identity key pair comprising wrapping private key using a wrapping key.

Example 5. The memory sub-system of any one of Examples 1-4, wherein the operations further comprise deriving the wrapping key using a key derivation function based on a first set of firmware measurements.

Example 6. The memory sub-system of any one of Examples 1-5, wherein accessing the first device identity key comprises: deriving an unwrapping key based on a second set of firmware measurements; and unwrapping the private key using the unwrapping key.

Example 7. The memory sub-system of any one of Examples 1-6, wherein injecting the new device identity certificate into the certificate chain for the memory device comprises storing the new device identity certificate in an active slot in local memory, the active slot in local memory being designated for storing a current device identity certificate.

Example 8. The memory sub-system of any one of Examples 1-7, wherein the new device identity certificate comprises the public key of the second device identity key pair.

Example 9. The memory sub-system of any one of Examples 1-8, wherein: the storing of the private key of the first device identity key pair is performed prior to rebooting of the memory sub-system; and the new device identifier is generating during the rebooting of the memory sub-system.

Example 10. The memory sub-system of any one of Examples 1-9, wherein the update to the firmware comprises an update to a bootloader implemented by the firmware.

Example 11. A method comprising: receiving, by a processing device, an update to firmware of memory sub-system comprising a memory device; and in response to receiving the update to the firmware, storing a private key of a first device identity key pair in a non-volatile memory component of the memory sub-system such that the private key is persisted upon reset of the memory sub-system, the first device identity key pair being generated based on a first device identifier associated with the memory device; upon reset of the memory sub-system, generating, by the processing device, a second device identifier associated with the memory device based on the update to the firmware of the memory sub-system; generating, by the processing device, a second device identity key pair based on the second device identifier; generating, by the processing device, a new device identity certificate for the memory sub-system based on a public key of the second device identity key pair; accessing the private key of the first device identity key pair; signing, by the processing device, the new device identity certificate using the private key of the first device identity key pair; and injecting, by the processing device, the new device identity certificate into a certificate chain for the memory device.

Example 12. The method of Example 11, further comprising destroying the private key of the first device identity key pair upon signing the new device identity certificate.

Example 13. The method of any one of Examples 11 or 12, further comprising: receiving the update to the firmware of the memory sub-system; and in response to receiving the update to the firmware, storing the private key of the first device identity key pair in the non-volatile memory component such that the private key is persisted upon reset.

Example 14. The method of any one of Examples 11-13, wherein storing the private key of the first device identity key pair comprising wrapping private key using a wrapping key.

Example 15. The method of any one of Examples 11-14, further comprising deriving the wrapping key using a key derivation function based on a first set of firmware measurements.

Example 16. The method of any one of Examples 11-15, wherein accessing the first device identity key comprises: deriving an unwrapping key based on a second set of firmware measurements; and unwrapping the private key using the unwrapping key.

Example 17. The method of any one of Examples 11-16, wherein injecting the new device identity certificate into the certificate chain for the memory device comprises storing the new device identity certificate in an active slot in local memory, the active slot in local memory being designated for storing a current device identity certificate.

Example 18. The method of any one of Examples 11-17, wherein the new device identity certificate comprises the public key of the second device identity key pair.

Example 19. The method of any one of Examples 11-18, wherein: the storing of the private key of the first device identity key pair is performed prior to rebooting of the memory sub-system; the new device identifier is generating during the rebooting of the memory sub-system; and the update to the firmware comprises an update to a bootloader implemented by the firmware.

Example 20. A computer-readable storage medium comprising instructions that, when executed by a processing device, configure the processing device to perform operations comprising: in response to receiving an update to firmware of a memory sub-system comprising a memory device, storing a private key of a first device identity key pair in a non-volatile memory component of the memory sub-system, the first device identity key pair being generated based on a first device identifier associated with the memory device; generating a second device identifier associated with the memory device based on the update to the firmware of the memory sub-system; generating a second device identity key pair based on the second device identifier; generating a new device identity certificate for the memory sub-system based on a public key of the second device identity key pair; accessing the private key of the first device identity key pair; signing the new device identity certificate using the private key of the first device identity key pair; destroying the private key of the first device identity key pair; and injecting the new device identity certificate into a certificate chain for the memory device.

Figure 6:
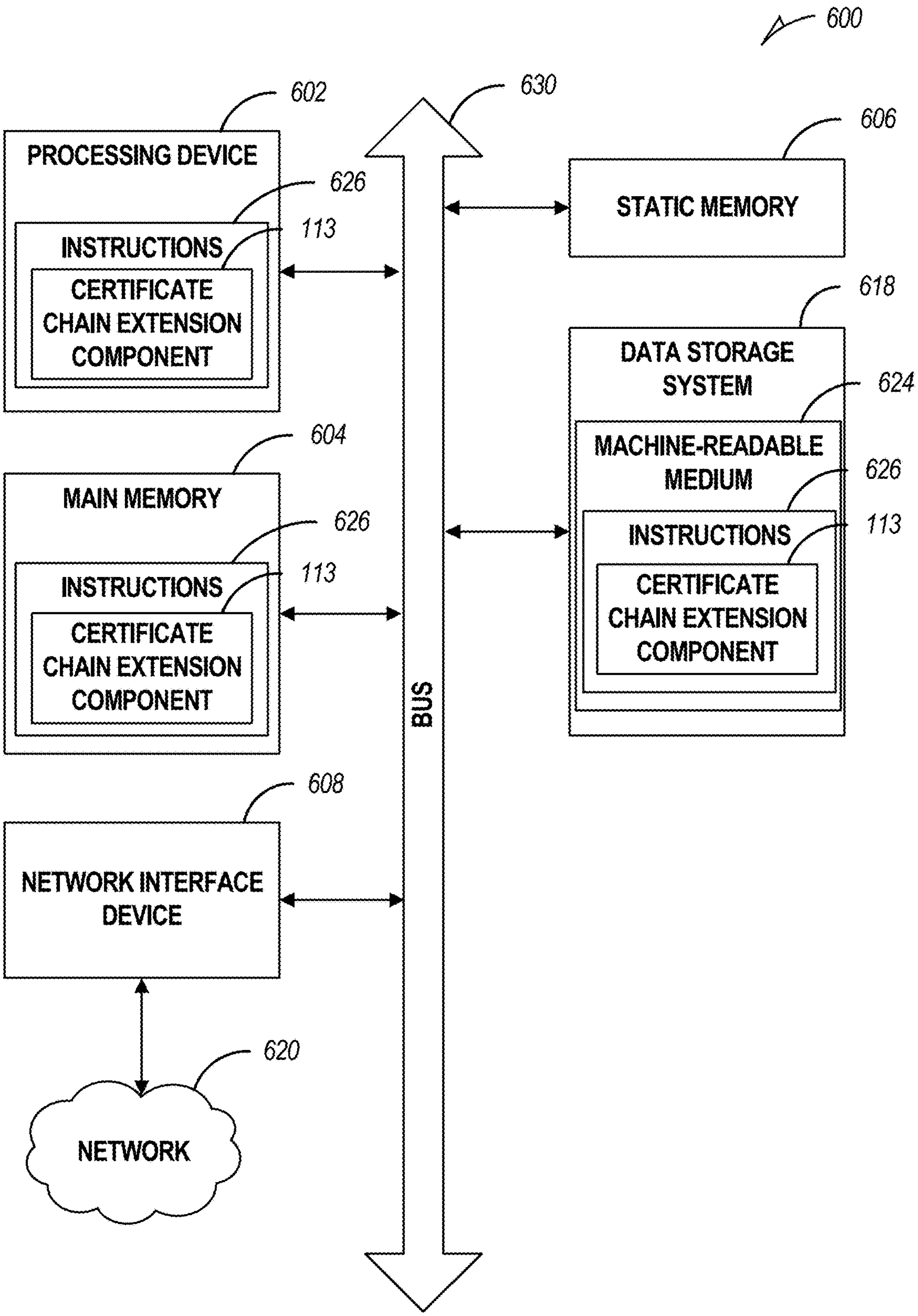
FIG. 6 is a block diagram of an example computer system in which embodiments of the present disclosure may operate.

FIG. 6 illustrates an example machine in the form of a computer system 600 within which a set of instructions can be executed for causing the machine to perform any one or more of the methodologies discussed herein. FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the certificate chain extension component 113 of FIG. 1). In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., ROM, flash memory, DRAM such as SDRAM or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an ASIC, a FPGA, a digital signal processor (DSP), network processor, or the like. The processing device 602 is configured to execute instructions 626 for performing the operations and steps discussed herein. The computer system 600 can further include a network interface device 608 to communicate over a network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a certificate chain extension component (e.g., the certificate chain extension component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, etc.

In the foregoing specification, embodiments of the disclosure have been described with reference to specific example embodiments thereof. It will be evident that various modifications can be made thereto without departing from the broader scope of embodiments of the disclosure as set forth in the following claims. The specification and drawings are, accordingly, to be regarded in an illustrative sense rather than a restrictive sense.

What is claimed is:

1. A memory sub-system comprising:

a memory device;

a non-volatile memory component storing a private key of a first device identity key pair generated based on a first device identifier; and a processing device, operatively coupled with the memory device and the non-volatile memory component, to perform operations comprising:

storing a private key of a first device identity key pair generated based on a first device identifier in the non-volatile memory component such that the private key is persisted upon reset, the storing comprising:

deriving a wrapping key using a key derivation function based on a first set of firmware measurements; and wrapping the private key using the wrapping key;

generating a second device identifier based on an update to firmware of the memory sub-system;

generating a second device identity key pair based on the second device identifier;

generating a new device identity certificate for the memory sub-system based on a public key of the second device identity key pair;

accessing the private key of the first device identity key pair;

signing the new device identity certificate using the private key of the first device identity key pair; and injecting the new device identity certificate into a certificate chain for the memory device.

2. The memory sub-system of claim 1, wherein the operations further comprise destroying the private key of the first device identity key pair upon signing the new device identity certificate.

3. The memory sub-system of claim 1, wherein the operations further comprise:

receiving the update to the firmware of the memory sub-system, wherein the storing of the private key performed and in response to receiving the update to the firmware, storing the private key of the first device identity key pair in the non-volatile memory component such that the private key is persisted upon reset.

4. The memory sub-system of claim 1, wherein accessing the first device identity key comprises:

deriving an unwrapping key based on a second set of firmware measurements; and unwrapping the private key using the unwrapping key.

5. The memory sub-system of claim 1, wherein injecting the new device identity certificate into the certificate chain for the memory device comprises storing the new device identity certificate in an active slot in local memory, the active slot in local memory being designated for storing a current device identity certificate.

6. The memory sub-system of claim 1, wherein the new device identity certificate comprises the public key of the second device identity key pair.

7. The memory sub-system of claim 3, wherein:

the storing of the private key of the first device identity key pair is performed prior to rebooting of the memory sub-system; and the new device identifier is generating during the rebooting of the memory sub-system.

8. The memory sub-system of claim 1, wherein the update to the firmware comprises an update to a bootloader implemented by the firmware.

9. A method comprising:

receiving, by a processing device, an update to firmware of memory sub-system comprising a memory device; and in response to receiving the update to the firmware, storing a private key of a first device identity key pair in a non-volatile memory component of the memory sub-system such that the private key is persisted upon reset of the memory sub-system, the first device identity key pair being generated based on a first device identifier associated with the memory device, the storing of the private key comprising:

deriving a wrapping key using a key derivation function based on a first set of firmware measurements; and wrapping the private key using the wrapping key;

upon reset of the memory sub-system, generating, by the processing device, a second device identifier associated with the memory device based on the update to the firmware of the memory sub-system;

generating, by the processing device, a second device identity key pair based on the second device identifier;

generating, by the processing device, a new device identity certificate for the memory sub-system based on a public key of the second device identity key pair;

accessing the private key of the first device identity key pair;

signing, by the processing device, the new device identity certificate using the private key of the first device identity key pair; and injecting, by the processing device, the new device identity certificate into a certificate chain for the memory device.

10. The method of claim 9, further comprising destroying the private key of the first device identity key pair upon signing the new device identity certificate.

11. The method of claim 9, further comprising:

receiving the update to the firmware of the memory sub-system, wherein the storing of the private key performed and in response to receiving the update to the firmware, storing the private key of the first device identity key pair in the non-volatile memory component such that the private key is persisted upon reset.

12. The method of claim 9, wherein accessing the first device identity key comprises:

deriving an unwrapping key based on a second set of firmware measurements; and unwrapping the private key using the unwrapping key.

13. The method of claim 9, wherein injecting the new device identity certificate into the certificate chain for the memory device comprises storing the new device identity certificate in an active slot in local memory, the active slot in local memory being designated for storing a current device identity certificate.

14. The method of claim 9, wherein the new device identity certificate comprises the public key of the second device identity key pair.

15. The method of claim 11, wherein:

the storing of the private key of the first device identity key pair is performed prior to rebooting of the memory sub-system;

the new device identifier is generating during the rebooting of the memory sub-system; and the update to the firmware comprises an update to a bootloader implemented by the firmware.

16. A non-transitory computer-readable storage medium comprising instructions that, when executed by a processing device, configure the processing device to perform operations comprising:

in response to receiving an update to firmware of a memory sub-system comprising a memory device, storing a private key of a first device identity key pair in a non-volatile memory component of the memory sub-system such that the private key is persisted upon reset of the memory sub-system, the first device identity key pair being generated based on a first device identifier associated with the memory device, the storing of the private key comprising:

deriving a wrapping key using a key derivation function based on a first set of firmware measurements; and wrapping the private key using the wrapping key;

generating a second device identifier associated with the memory device based on the update to the firmware of the memory sub-system;

generating a second device identity key pair based on the second device identifier;

generating a new device identity certificate for the memory sub-system based on a public key of the second device identity key pair;

accessing the private key of the first device identity key pair;

signing the new device identity certificate using the private key of the first device identity key pair;

destroying the private key of the first device identity key pair; and injecting the new device identity certificate into a certificate chain for the memory device.

* * * * *